(12) United States Patent
Smith et al.

(10) Patent No.: US 8,094,471 B1
(45) Date of Patent: Jan. 10, 2012

(54) POWER SUPPLY USING DOUBLE LATCH CIRCUIT FOR AUTOMATIC INPUT VOLTAGE RANGE PROGRAMMING

(75) Inventors: Scott L. Smith, Madison, AL (US); Steven M. Robinson, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 374 days.

(21) Appl. No.: 12/368,605

(22) Filed: Feb. 10, 2009

(51) Int. Cl.
*H02M 3/18* (2006.01)
*H02M 5/42* (2006.01)

(52) U.S. Cl. ............................. 363/61; 363/89
(58) Field of Classification Search .............. 363/59–61, 363/84–89, 125, 126
See application file for complete search history.

(56) References Cited

U.S. PATENT DOCUMENTS

| | | | |
|---|---|---|---|
| 4,590,546 A | 5/1986 | Maile | 363/37 |
| 4,654,538 A | 3/1987 | Lethellier | 307/75 |
| 4,658,345 A | 4/1987 | Ingman | 363/143 |
| 4,665,323 A | 5/1987 | Russell et al. | 307/75 |
| 4,780,805 A | 10/1988 | Chewuk et al. | 363/142 |
| 4,783,729 A | 11/1988 | Konopka | 363/143 |
| 4,805,083 A | 2/1989 | Konopka | 363/143 |
| 4,843,301 A | 6/1989 | Belanger | 323/299 |
| 4,845,607 A | 7/1989 | Nakao et al. | 363/49 |
| 4,864,488 A | 9/1989 | Bulmahn et al. | 363/143 |
| 4,933,832 A | 6/1990 | Schneider et al. | 363/143 |
| 4,937,731 A | 6/1990 | Konopka | 363/143 |
| 5,097,402 A | 3/1992 | Kriz et al. | 363/61 |
| 5,138,547 A | 8/1992 | Swoboda | 363/143 |
| 5,162,984 A | 11/1992 | Castagnet et al. | 363/61 |
| 6,147,888 A | 11/2000 | Rivet | 363/143 |
| 6,320,772 B1 * | 11/2001 | Doyama et al. | 363/89 |
| 6,449,180 B1 | 9/2002 | Yang et al. | 363/142 |
| 7,282,900 B2 * | 10/2007 | Oswald et al. | 323/282 |
| 2010/0194354 A1 * | 8/2010 | Gotou et al. | 320/163 |

* cited by examiner

*Primary Examiner* — Matthew Nguyen
(74) *Attorney, Agent, or Firm* — Allen, Dyer, Doppelt, Milbrath & Gilchrist, P.A.

(57) ABSTRACT

A power supply includes a rectifier circuit having a rectifier mode and a voltage doubler mode. An AC switch is coupled to the rectifier circuit and switches the rectifier circuit into the rectifier mode when a higher AC line voltage is supplied and a voltage doubler mode when a lower AC line voltage is supplied. A control circuit is connected to the AC switch and detects the higher or lower AC line voltages and is operable for latching the rectifier circuit in the rectifier mode when the higher AC line voltage is detected and in the voltage doubler mode when the lower AC line voltage is detected. The latch circuit maintains a latched configuration in either the rectifier or voltage doubler mode during voltage transients and in the rectifier mode during start-up transients.

16 Claims, 3 Drawing Sheets

POWER SUPPLY USING DOUBLE LATCH CIRCUIT FOR AUTOMATIC INPUT VOLTAGE RANGE PROGRAMMING

FIELD OF THE INVENTION

The present invention relates to power supplies, and more particularly, the present invention relates to power supplies with voltage doubler circuits.

BACKGROUND OF THE INVENTION

In the telecommunications industry, there is a market segment known as Enterprise Networks (EN) referring typically to a large-scale network for a large enterprise and connecting many components or networks such as LAN's, WAN's and other applications and components. Most of the products manufactured to serve this market are powered from commercial utility AC power lines. This electrical power is an alternating current/voltage and is supplied at 115 VAC in the United States and at 230 VAC in most parts of the rest of the world. In order to market EN products in the international market, it is desirable that each product be capable of operation from either 115 or 230 VAC utility line input voltage without any manufacturing or customer involvement.

Electronic circuits in the EN equipment use direct current/voltage (DC) to operate and this power should be supplied to the electronic circuits at a constant non-varying DC level. In order to accommodate the DC voltage requirements of these electronic circuits, a power supply operates as a power converter that is typically incorporated into the EN equipment to convert the higher utility line AC voltage to the lower DC voltage. The power supply handles the two different input voltage levels supplied from the utilities in order to provide the proper power. One method currently used by power supplies connects a programmable rectifier circuit to the AC utility input. The rectifier has a high voltage DC output of approximately 310 VAC. It is programmed and configured as a voltage doubler when the input is 115 VAC and programmed and configured as a full wave bridge rectifier when the input is 230 VAC. It would be advantageous to perform automatic utility line voltage selection and programming, however, and permit control circuit latching or locking of the rectifier circuit in the programmed state.

SUMMARY OF THE INVENTION

A power supply includes a rectifier circuit having a bridge rectifier mode and a voltage doubler mode. An AC switch is coupled to the rectifier circuit and switches the rectifier circuit into the bridge rectifier mode when a higher AC line voltage is supplied and a voltage doubler mode when a lower AC line voltage is supplied. A control circuit is connected to the AC switch and detects the higher or lower AC line voltages and is operable for latching the rectifier circuit in the bridge rectifier mode when the higher AC line voltage is detected and in the voltage doubler mode when the lower AC line voltage is detected. The control circuit maintains a latched configuration in either the bridge rectifier or voltage doubler mode during voltage transients and in the bridge rectifier mode during start-up transients.

In one aspect, the AC switch is formed as a triac. The rectifier circuit can be formed as a diode bridge. A half-wave rectifier circuit is connected between the control circuit and the AC line voltage. The rectifier circuit is operable in a full-wave rectifier mode when the higher AC line is detected and in voltage doubler mode when the lower AC line is detected.

The control circuit is also operable for maintaining a full-wave rectifier mode during start-up transients. A 115 VAC voltage detect and latch circuit senses the lower AC line voltage. The 115 VAC voltage detect and latch circuit further comprises a circuit for outputting a latched inhibit signal to the 230 VAC detect and latch circuit for enabling the AC switch such that transient surges of the AC line voltage source are not interpreted wherein the AC switch switches the rectifier circuit into the bridge rectifier mode. A 230 VAC voltage detect and latch circuit detects the higher AC line voltage. A drive circuit is connected to the AC switch that is enabled when the lower AC line voltage is sensed and not enabled when the higher AC line voltage is sensed. The 230 VAC voltage detect and latch circuit further comprises a circuit for outputting a latched disabled signal to the drive circuit for disabling the AC switch such that transient dips, sags and drop-outs of the AC line voltage supply are not interpreted wherein the AC switch switches the rectifier circuit into the voltage doubler mode. The low voltage detect and latch circuit can be formed as a delay circuit to allow any sensed voltage to reach peak value before voltage sensing begins to prevent inadvertent sensing of the lower AC line voltage during initial turn-on.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
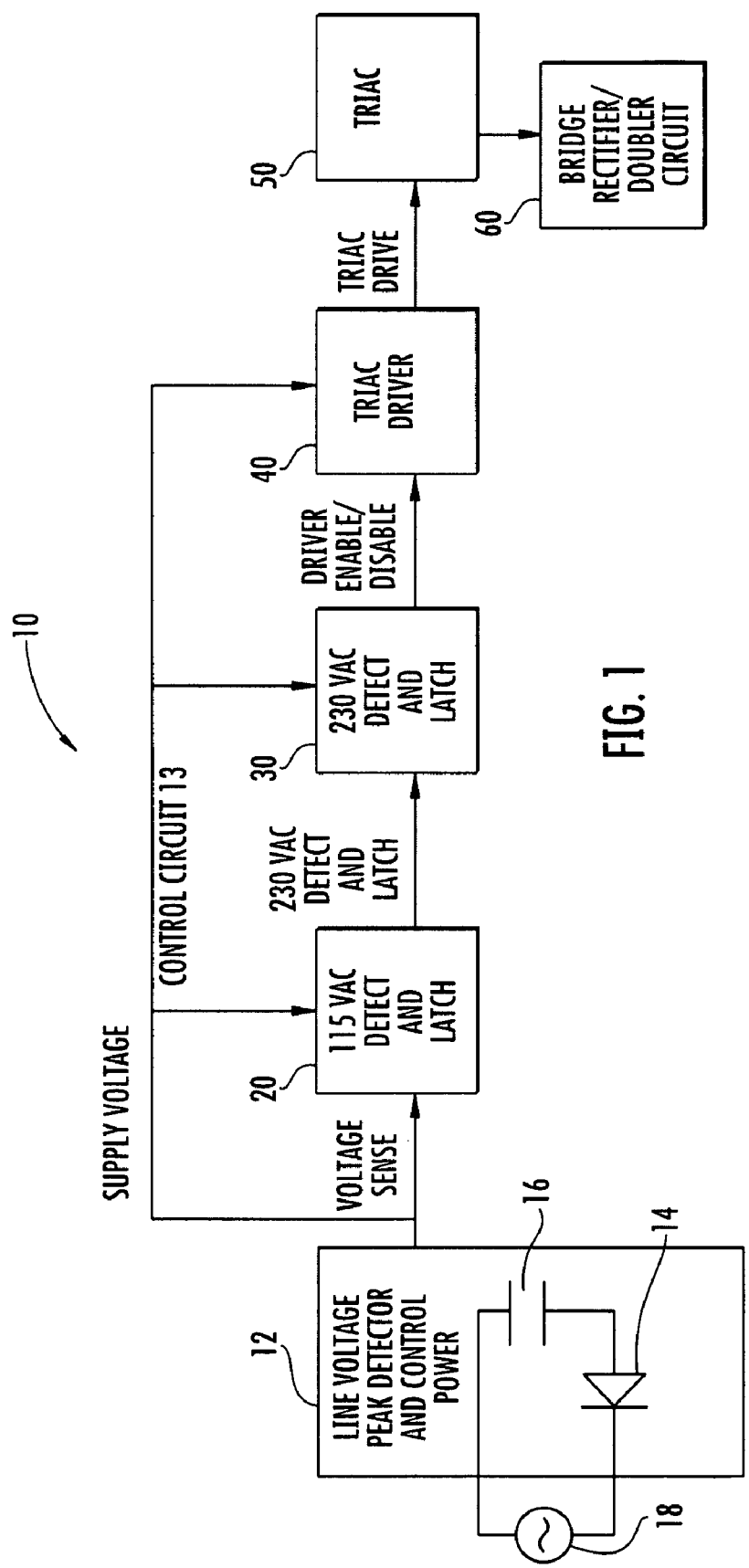
FIG. 1 is an overall block diagram of the power supply that includes a latching control circuit and bridge rectifier/voltage doubler in accordance with a non-limiting example power supplies.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with one non-limiting aspect, a power supply has a bridge rectifier/voltage doubler and control circuit operable, for example, as a portable appliance power supply for use with either 110 to 120 VAC or 220 to 240 VAC line voltage. This power supply is also capable of automatically detecting the presence of a 110 to 120 VAC or 220 to 240 VAC line and activating appropriate voltage rectification or voltage doubling circuitry. The circuit latches or locks-out the voltage doubling circuitry upon detection of a 220 to 240 VAC line voltage. This prevents a transient voltage droop from inadvertently actuating the voltage doubler circuit while connected to a 220 to 240 VAC line. The control circuit also has the capability to inhibit and latch out the bridge rectifier circuitry upon the detection of a 110-120 VAC line voltage. This prevents a transient voltage surge from inadvertently actuating the bridge rectifier while connected to a 110-120 VAC line. The circuit includes various time delay circuits for ensuring correct operation during a voltage ramp up and transient time periods. The technical problem associated when conventional voltage doubler circuits malfunction when an AC line voltage, such as supplied from utility, has voltage variations that extend outside an expected voltage range are overcome with the circuit as described. The latch circuit can maintain the programmed diode bridge configuration and prevent malfunctions by preventing voltage doubler circuit activation.

In accordance with a non-limiting example, the power supply includes a control circuit to perform automatic utility line voltage selection and programming. In one non-limiting example, an AC switch as a semiconductor element, for example, a triac, is incorporated as the programmed element. A DC to DC converter can follow the rectifier to produce the lower level DC voltage needed to power the electronic circuits.

The control circuit in combination with the triac in this example performs several functions in addition to detecting which utility line voltage is connected to the power converter. After detection has occurred and the triac has been programmed, line voltage variations in the form of dips, sags and surges will occur that can be interpreted/detected as a change in the utility voltage supplied. Once latched the control circuit does not interpret these line voltage variations as a signal to change the triac programming because this will result in power converter malfunction. Once a utility voltage has been detected and the triac programming mode has been set, the control circuit latches in this programmed state so as not to change the programming when line voltage variations occur.

The control circuit maintains the full wave programmed state during start up transitions in order to prevent rectifier DC output voltage overshoot when starting from 230 VAC utility voltage. The control circuit also overcomes problems with nuisance latching during start-up transitions. The control circuit implements by allowing some delays. The control circuit includes a drive circuit that drives the AC switch typically as a thyristor triac. The triac drive circuit can be formed as a current sink that allows gate sinking current from the triac to cause the triac to conduct when so programmed.

It should be understood that the power supply including the control circuit is operable with a portable appliance power supply used with either 110-120 VAC or 220-240 VAC line voltage. The power supply through the control circuit is also capable of automatically detecting the presence of 110-120 VAC or 220-240 VAC and activating appropriate voltage rectification or voltage doubling circuitry. The control circuit has the capability to latch or lock out the voltage doubling circuitry upon the detection of a 220-240 VAC line voltage. This prevents a transient voltage droop from inadvertently actuating the voltage doubler while connected to a 220-240 VAC line. The control circuit also has the capability to inhibit and latch out the bridge rectifier circuitry upon the detection of a 110-120 VAC line voltage. This prevents a transient voltage surge from inadvertently actuating the bridge rectifier while connected to a 110-120 VAC line. Time delays for ensuring correct operation during voltage ramp up and transient time periods are included.

Figure 2:
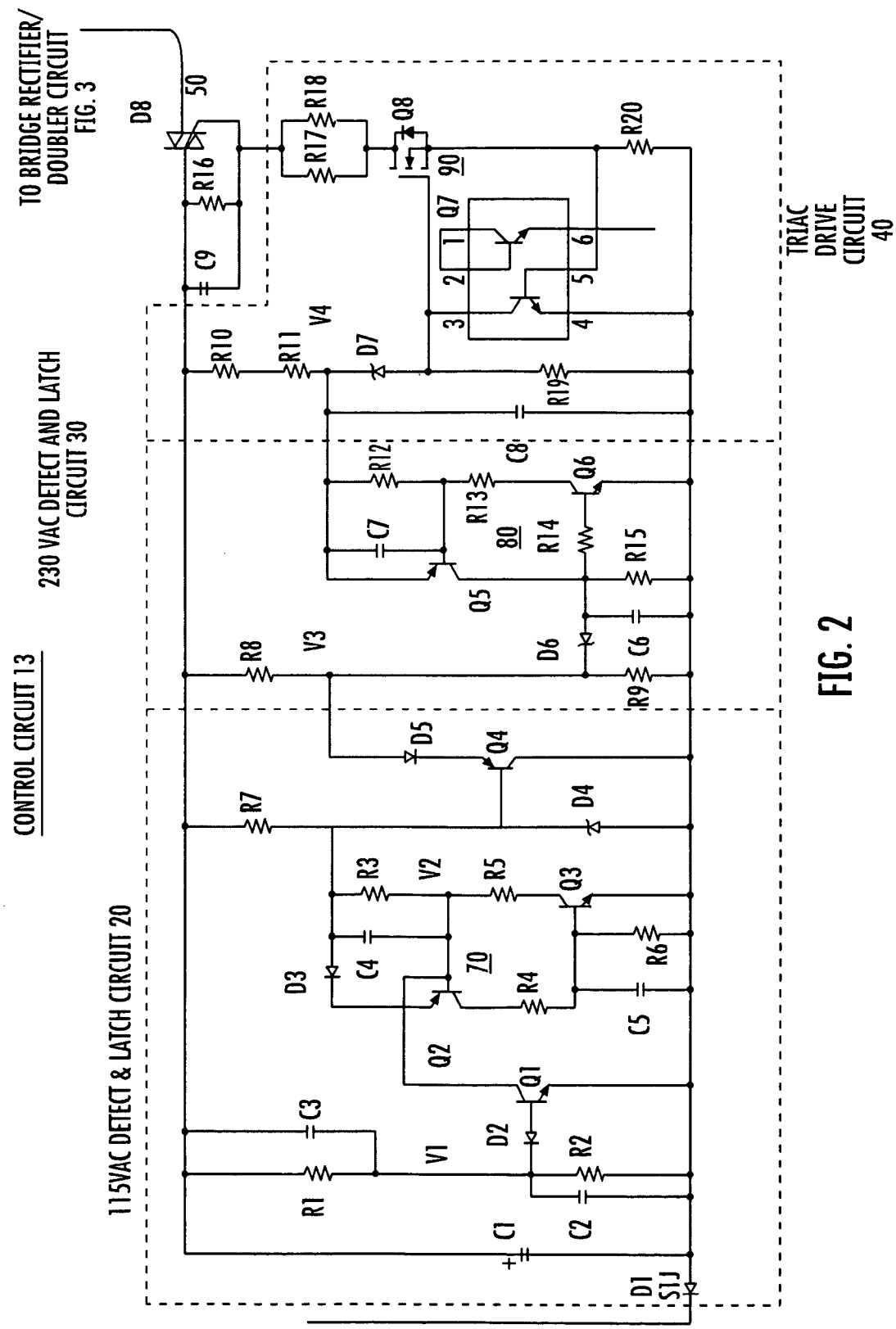
FIG. 2 is a detailed schematic circuit diagram of a portion of the power supply showing the latching control circuit in the high-level block diagram of FIG. 1.
Figure 3:
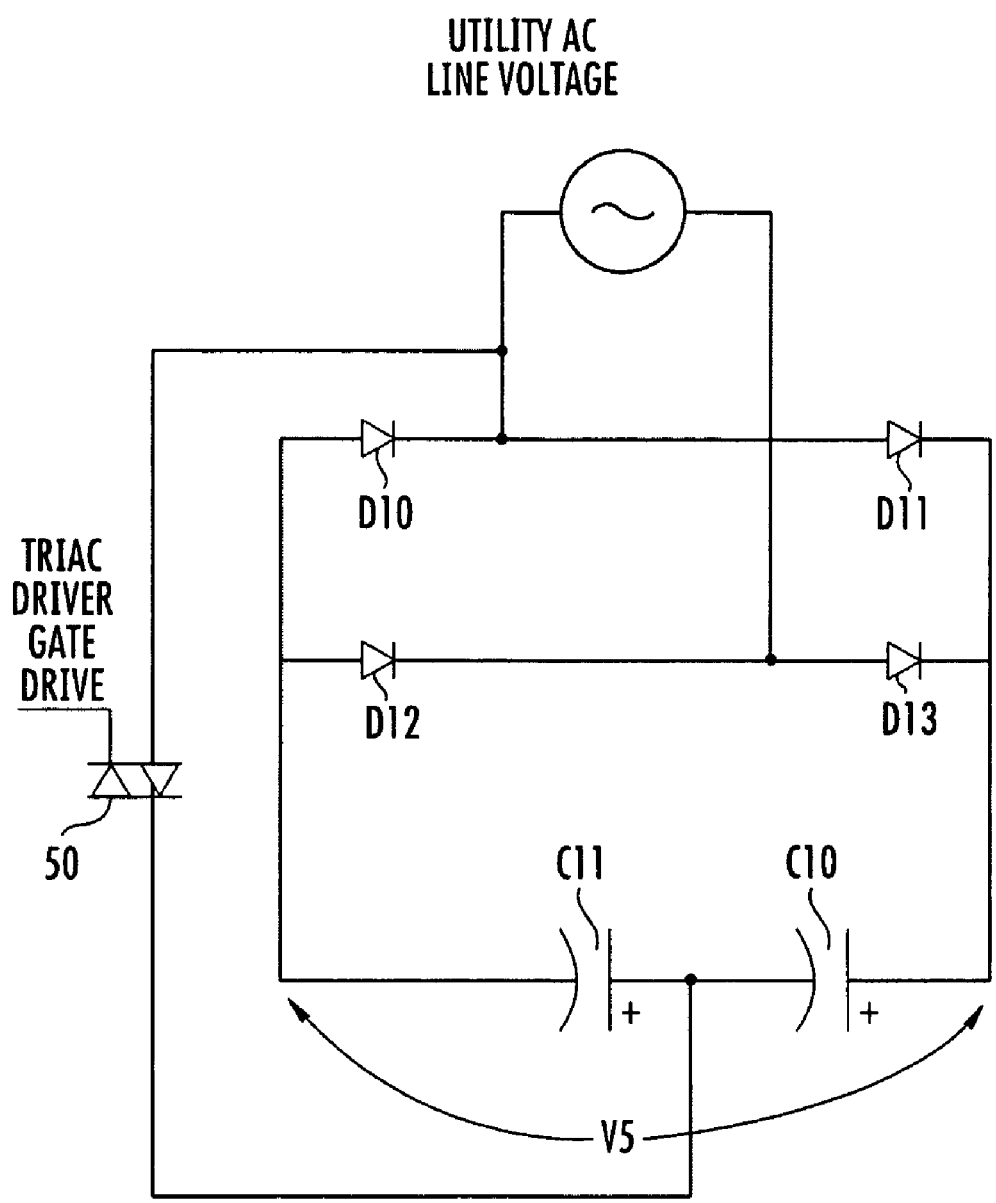
FIG. 3 is a schematic circuit diagram of the bridge rectifier/voltage doubler circuit operable with the circuit shown FIGS. 1 and 2.

Reference is now made to FIGS. 1-3, which shows in FIG. 1 at 10 a basic block diagram of the power supply with the latch circuit that is operable similar to a power converter and bridge rectifier/doubler circuit. FIG. 2 is a detailed schematic circuit diagram of a portion of the circuit 10 shown in FIG. 1. FIG. 3 is a schematic circuit diagram of the bridge rectifier/voltage doubler circuit operable with the circuit 10 of FIGS. 1 and 2.

These circuits as will be described overcome the technical problems associated when conventional voltage doubler circuits may malfunction when an AC line voltage, such as supplied from a utility, has voltage variations that extend outside an expected voltage range. A latching circuit for controlling a diode bridge as a doubler circuit prevents doubler circuit malfunctions as described below.

FIG. 1 is a high-level general block diagram of the power supply 10 and including the latch circuit operable similar to a control circuit, and showing a triac and a configurable diode bridge rectifier/voltage doubler circuit. As explained in detail below, the triac is programmed by either enabling or disabling the triac drive circuit. For 115 VAC programming, the triac is enabled to conduct and for 230 VAC programming the triac conduction is disabled as will be explained in detail below.

The first block in FIG. 1 corresponds to a line voltage peak detector and control circuit power 12 and serves to provide voltage to power the other circuit components as illustrated and sense peak line voltage. The diode 14 and capacitor 16 form a half wave rectifier circuit. The capacitor 16 is charged to the peak voltage level of the sine wave AC input voltage generated by the AC power source 18. The capacitor 16 voltage is used as a sense point because the relationship between peak and RMS value of the sine wave is known. The capacitor value is sufficiently large so that the voltage is DC with a small AC ripple component and is used as the voltage to power the rest of control circuit 13.

A 115 VAC detect and latch circuit is shown at block 20 and receives the supply voltage from the line voltage peak detector and control power circuit 12. This detect and latch circuit 20 also uses the supply voltage as a voltage sense point from the circuit 12. A 230 VAC detect and latch circuit is shown at block 30 and outputs a driver signal as an enable and disable signal to the triac drive circuit shown at block 40. The triac drive circuit 40 sends a triac drive signal to the triac 50, which in turn, outputs its signal to the doubler circuit 60.

The 115 VAC detect and latch circuit 20 is shown in FIG. 1 at 20 and in FIG. 2 by the dashed lines and senses and detects when the AC line voltage is 115 VAC. When 115 VAC is detected, the circuit sends a signal to inhibit the 230 VAC detect and latch circuit 30. The sensed voltage is proportionally reduced by a voltage divider formed by resistors R1 and R2 as shown in circuit 20. This reduced voltage is identified as V1 in FIG. 2. The voltage level of V1 controls an SCR latch 70 formed by transistors Q2, Q3 and resistors R3, R4, R5 and R6.

Resistor R7 and zener diode D4 produce a reference voltage at V2. When the voltage at V1 is reduced, a P-N semiconductor forward biased voltage drops below V2 (which indicates 115 VAC input), and Q1 will conduct, which in turn will cause Q2 to conduct. Q2 conduction will bias Q3 into conduction and provide positive feedback to Q2 resulting in a latched SCR type conduction of Q2 and Q3. The conduction of Q2 and Q3 will pull the voltage at V2 close to zero resulting in conduction of D5 through Q4. Conduction through D5 operates as an inhibit signal to the 230 VAC detect and latch circuit 30. The 115 VAC detect and latch circuit 20 latches the 230 VAC inhibit so that it will not change in the presence of line voltage surges that could be interpreted as 230 VAC. This keeps the triac 50 latched in a voltage doubler configuration and prevents any subsequent DC-to-DC converter malfunction that would occur if the circuit tried to switch back and forth between a voltage doubler and a full rectifier wave mode.

The 115 VAC detect and latch circuit 20 senses the peak line voltage when it initially turns on. It can take nearly an entire line cycle for the peak detector to reach peak voltage. The 115 VAC detect and latch circuit 20 can interpret the less than peak voltage as a 115 VAC line condition. To prevent this misinterpretation, the 115 VAC detect and latch circuit 20 incorporates capacitor C3 to cause a time delay to allow the sensed voltage to reach peak value before detection begins. Capacitor C3 causes a time delay by bypassing the voltage divider resistor R1 and holding the voltage at V1 at a higher than steady state value until C3 becomes charged.

The 230 VAC detect and latch circuit 30 is shown in dashed lines in FIG. 2 and senses and detects when there is a 230 VAC line condition. In the presence of 230 VAC and in an absence of an inhibit single from the 115 VAC detect and latch circuit 20, it will disable the triac driver 40 to prevent triac conduction and thereby configure into a full wave rectifier mode. The sensed voltage is proportionally reduced by a voltage divider formed by resistors R8 and R9 in the latch inhibit circuit 30 as shown in FIG. 2. This reduced voltage is identified as V3 in FIG. 2.

The voltage level of V3 controls an SCR latch 80 formed by transistors Q5, Q6 and resistors R12, R13, R14 and R15. Resistors R10, R11, R19 and zener diode D7 produce a reference voltage at V4. When the voltage at V3 is greater than the zener diode voltage D6 plus a P-N semiconductor forward biased voltage drop (which indicates 230 VAV input), Q6 will conduct, which in turn, will cause Q5 to conduct. Q5 conduction will provide positive feedback to Q6, resulting in latched SCR type conduction of Q5 and Q6. The conduction of Q5 and Q6 will pull the voltage at V4 close to zero, which creates the disable signal to the triac drive circuit 40 that outputs to the triac 50. The disable signal is latched so that dips, sags and drop outs of the AC line voltage will not be interpreted as a 115 VAC line condition and the triac will not attempt to change from full wave rectifier mode to voltage doubler mode which would cause DC to DC converter malfunction.

The triac drive circuit 40 for the gate of the triac is shown in dashed lines in FIG. 2. The triac drive circuit 40 in this example is a current sink that is implemented using a linear voltage regulator 90 with Q8 as a pass transistor. Voltage is regulated across resistor R20 by the base emitter junction voltage of feedback transistor Q7. A relatively constant voltage of 0.7 volts is maintained across R20, which results in a constant current through the series circuit of triac D8 gate, parallel resistors R17, R18, and pass transistor Q8 and R20. The natural state of the current sink drive is to sink current and enable conduction of the triac, which configures a voltage doubler mode. The drive is disabled/inhibited by keeping the voltage at V4 close to zero volts. In the absence of an inhibit signal during the 230 VAC "turn on" transition, the voltage doubler circuit 60 can be enabled for a portion of the cycle and cause a problematic DC output voltage overshoot from the doubler/rectifier. To prevent this problem, the drive circuit incorporates capacitor C8 to delay the rise of voltage at V4 during start-up to delay conduction of the triac 50 by disabling Q8 until the control circuit can provide the appropriate programming signal.

The voltage doubler circuit 60 is shown in FIG. 3. The utility AC line voltage is connected to the four diodes D10-D13. For 230 VAC operation the four diodes are configured as a full wave bridge rectifier and the triac is essentially non existent because it does not conduct. The DC full wave bridge output is connected to the series connected capacitors C10 and C11. The capacitors serve to filter the otherwise very high ripple voltage output of the full wave bridge rectifier to create a relatively low ripple voltage V5 across series connected capacitors C10,C11. The voltage V5 is the 310 VDC that is further converted to the lower power supply DC output voltages needed. For 115 VAC operation only diodes D13 and D10 are used so diodes D11 and D12 are essentially not present. The triac conducts like a switch and could be replaced with a short circuit. This configuration is then a conventional voltage doubler with V5 being the 310 VDC output.

It should be understood that different values can be used for the various circuit components shown in FIG. 2. An example of non-limiting values and types of component circuits that can be used for the illustrated circuits of FIGS. 1-3 are shown below.

D1—SIJ
C1—10 µF:400V
R1—560K
C2—0.01 µF:50V
R2—187K
D2—SIJ
Q1—NMDT2907
Q2—HBDM60
D3—BAS20DW
R3—10K
Q3—HBDM60
C3—0.22 µF:400V
C4—0.01 µF:50V
R4—10K
Q4—NMDT2907
D4—B2T52C
C5—0.01 µF:50V
R5—10K
D5—BAS20DW
Q5—HBDM60
R6—100K
D6—52C43
C6—0.01 pF:50V
Q6—HBDM60
C7—0.01 µF:50V
D7—52C43
Q7—2N3904D
R7—560K
R8—560K
Q8—IRFR420
C8—0.33 µF:50V
D8—MAC228A8
C9—1200 µF:50V
R9—232K
R10—120K
R11—120K
R12—100K
R13—10K
R14—10K
R15—4.75K
R16—1K
R17—20K
R18—20K
R19—100K
R20—140K

D10 through D13 have values depending on application, end uses and design choices.

Many modifications and other embodiments of the invention will come to the mind of one skilled in the art having the benefit of the teachings presented in the foregoing descrip- That which is claimed is:

1. A power supply, comprising:
a rectifier circuit having a rectifier mode and a voltage doubler mode;
an AC switch coupled to the rectifier circuit for switching the rectifier circuit into the rectifier mode when a higher AC line voltage is supplied and a voltage doubler mode when a lower AC line voltage is supplied; and
a control circuit connected to the AC switch that detects the higher or lower AC line voltages and operable for latching the rectifier circuit in the rectifier mode when the higher AC line voltage is detected and in the voltage doubler mode when the lower AC line voltage is detected and maintaining a latched configuration in either the rectifier or voltage doubler mode during voltage transients and in the rectifier mode during start-up transients, wherein said control circuit comprises a low voltage detect and latch circuit configured to sense the lower AC supply voltage, and a latch inhibit circuit that detects the AC supply voltage and outputs an inhibit signal in response to the detection of a lower input voltage, and a high voltage detect and latch circuit connected between the low voltage detect and latch circuit and the AC switch and in the presence of the lower voltage and receipt of the latch signal, configure the AC switch to switch the rectifier circuit into the voltage doubler mode and remain in a latched condition, and in the absence of the inhibit signal and in the presence of the higher voltage configure the AC switch to switch the rectifier circuit into a rectifier mode and remain in the latched condition, wherein the low voltage detect and latch circuit includes a time delay circuit responsive to voltage changes and allow a voltage to reach a peak value before detecting an AC supply voltage and generating an inhibit signal.

2. The power supply according to claim 1, wherein said AC switch comprises a triac.

3. The power supply according to claim 1, wherein said rectifier circuit comprises a diode bridge.

4. The power supply according to claim 1, and further comprising a half-wave rectifier circuit connected between said control circuit and an AC line voltage supply.

5. The power supply according to claim 4, wherein said rectifier circuit is operable in a full-wave rectifier mode when the higher AC line is detected.

6. The power supply according to claim 5, wherein said control circuit is operable for maintaining a full-wave rectifier mode during start-up transients.

7. A power supply, comprising:
a diode bridge having a full-wave rectifier mode and a voltage doubler mode;
a triac coupled to the diode bridge for switching the diode bridge into the full-wave rectifier mode when a higher AC line voltage is supplied and switching the diode bridge into a voltage doubler mode when a lower AC line voltage is supplied;
a control circuit connected to the triac that detects the higher or lower AC line voltages and comprising a triac drive circuit connected to the triac for driving and switching the triac and maintaining a latched configuration in either the full-wave rectifier mode or the voltage doubler mode during voltage transients, said control circuit further comprising,
wherein said control circuit comprises a low voltage detect and latch circuit configured to sense the lower AC supply voltage and a latch inhibit circuit that detects the AC supply voltage and outputs an inhibit signal in response to the detection of a lower input voltage, and a high voltage detect and latch circuit connected between the low voltage detect and latch circuit and the triac, and in the presence of the lower voltage and receipt of the latch signal, configure the triac to switch the diode bridge into the voltage doubler mode and remain in a latched condition, and in the absence of the inhibit signal and in the presence of the higher voltage, configure the triac to switch the diode bridge into a rectifier mode and remain in the latched condition, wherein the low voltage detect and latch circuit includes a time delay circuit responsive to voltage changes and allow a voltage to reach a peak value before detecting an AC supply voltage and generating an inhibit signal.

8. The power supply according to claim 7, and further comprising a half-wave rectifier circuit connected between said latch circuit and an AC line voltage supply.

9. The power supply according to claim 8, wherein said latch circuit is operable for maintaining a full-wave rectifier mode during start-up transients.

10. The power supply according to claim 7, wherein said detect and latch circuit comprises a circuit for generating a latched inhibit signal to said latch inhibit circuit to maintain the triac driving the diode bridge in latched voltage doubler configuration.

11. The power supply according to claim 10, wherein said control circuit is operable for disabling the triac drive circuit in the absence of the latched signal and prevent triac conduction.

12. The power supply according to claim 7, wherein said triac drive circuit comprises a current sink circuit.

13. A method of operating a power supply comprising:
detecting higher or lower AC line voltages in a control circuit that is connected by an AC switch to a rectifier circuit that is switched into a rectifier mode when a higher AC line voltage is supplied and a voltage doubler mode when a lower AC line voltage is supplied;
latching the rectifier circuit in the rectifier mode when the higher AC line voltage is detected and in the voltage doubler mode when the lower AC line voltage is detected,
maintaining a latched configuration in either the rectifier or voltage doubler mode to which the rectifier circuit has been switched during voltage transients and in the rectifier mode during start-up transients; and
sensing the lower AC supply voltage within a low voltage detect and latch circuit of a control circuit that includes a latch inhibit circuit that detects the AC supply voltage and outputs an inhibit signal in response to the detection of a lower input voltage, and a high voltage detect and latch circuit connected between the low voltage detect and latch circuit and the AC switch and in the presence of the lower voltage and receipt of the latch signal configuring the AC switch to switch the rectifier circuit into the voltage doubler mode and remain in a latched condition, and in the absence of the inhibit signal and in the presence of the higher voltage, configuring the AC switch to switch the rectifier circuit into rectifier mode and remain latched into the rectifier mode, wherein the low voltage detect and latch circuit includes a time delay circuit responsive to voltage changes and allowing a voltage to reach a peak value before detecting an AC supply voltage and outputting an inhibit signal.

14. The method according to claim 13, which further comprises forming the AC switch as a triac.

15. The method according to claim 13, which further comprises forming the rectifier circuit as a diode bridge.

16. The method according to claim 13, which further comprises maintaining a full-wave rectifier mode during start-up transients.

\* \* \* \* \*